United States Patent [19]

Lehmann et al.

[11] Patent Number: 4,983,090

[45] Date of Patent: Jan. 8, 1991

[54] SYSTEM FOR FEEDING BULK MATERIAL

[75] Inventors: Rolf Lehmann, Seon; Daniel P. Kaelin, Aarau, both of Switzerland

[73] Assignee: K-Tron International, Inc., Pitman, N.J.

[21] Appl. No.: 349,086

[22] Filed: May 9, 1989

[30] Foreign Application Priority Data

Jan. 25, 1989 [CH] Switzerland ............... 217/89

[51] Int. Cl.⁵ .................................. B65G 1/00
[52] U.S. Cl. ........................... 414/326; 414/21; 222/413; 198/535; 198/548
[58] Field of Search .......... 414/326, 322, 310, 21; 222/412, 413; 198/535, 536, 545, 546, 548, 550.1, 672, 674, 359, 360, 370

[56] References Cited

U.S. PATENT DOCUMENTS

| | | | |
|---|---|---|---|
| 690,001 | 12/1901 | Weeks | 198/536 |
| 1,122,619 | 12/1914 | Maas | 198/550.1 X |
| 2,481,860 | 11/1947 | Miller . | |
| 2,767,963 | 10/1956 | Ringten et al. | 198/536 X |
| 2,896,771 | 7/1959 | Mecham . | |
| 3,090,507 | 5/1963 | Gutekunst et al. . | |
| 3,179,272 | 4/1965 | Goldberger . | |
| 3,633,879 | 1/1972 | Prichard . | |
| 3,717,272 | 2/1973 | Chartier et al. . | |
| 4,201,287 | 6/1980 | Straub et al. . | |
| 4,364,469 | 12/1982 | Rudolph . | |
| 4,613,275 | 9/1986 | Karlowsky | 414/326 X |
| 4,646,910 | 3/1987 | Johanson et al. . | |
| 4,714,396 | 12/1987 | Bernard et al. | 414/21 X |

FOREIGN PATENT DOCUMENTS

| | | |
|---|---|---|
| 252123 | 2/1967 | Austria . |
| 1175378 | 10/1984 | Canada . |
| 1202591 | 4/1986 | Canada ............... 414/326 |
| 851020 | 9/1952 | Fed. Rep. of Germany . |
| 967610 | 11/1957 | Fed. Rep. of Germany . |
| 1829386 | 2/1961 | Fed. Rep. of Germany . |
| 1147888 | 4/1963 | Fed. Rep. of Germany . |
| 2021400 | 11/1970 | Fed. Rep. of Germany . |
| 2009679 | 9/1971 | Fed. Rep. of Germany . |
| 2160750 | 6/1973 | Fed. Rep. of Germany . |
| 2838110 | 3/1980 | Fed. Rep. of Germany . |
| 3300911 | 8/1983 | Fed. Rep. of Germany . |
| 8316568.1 | 11/1983 | Fed. Rep. of Germany . |
| 8414519.6 | 7/1984 | Fed. Rep. of Germany . |
| 3520280 | 1/1987 | Fed. Rep. of Germany . |
| 1004337 | 3/1952 | France . |
| 1005403 | 4/1952 | France . |
| 2030957 | 11/1970 | France . |
| 2586170 | 2/1987 | France . |
| 0079127 | 4/1987 | Japan ............... 414/326 |

Primary Examiner—H. Grant Skaggs
Assistant Examiner—Keith L. Dixon
Attorney, Agent, or Firm—Oliff & Berridge

[57] ABSTRACT

The feeding system comprises one or more material storage devices and a discharge device associated with each storage device. Each discharge device comprises a conveyor channel tilted upwardly and away from its inlet arranged to be connected with the outlet of the storage device. A chute is adapted to be loosenably suspended, rapidly and simply, on the lower longitudinal side of the conveyor channel in a working position, a sampling position or in an emptying position, as required. In its working position the chute is positioned parallel to the conveyor channel, while the upper outlet of the conveyor channel opens into the chute at the upper end of the latter. In its sampling position the chute is tilted downward and away from the upper end of the conveyor channel at a right angle to the latter. In its emptying position the chute is tilted downward and away from the lower end, i.e. from the start of the conveyor channel and at a right angle to the latter. At this lower end the conveyor channel comprises a lower exit adapted to be closed off.

24 Claims, 3 Drawing Sheets

SYSTEM FOR FEEDING BULK MATERIAL

BACKGROUND OF THE INVENTION

The present invention relates to a system for feeding at least one bulk material and comprising at least one device for storing the material, such as a container or bin, furthermore a conveyor channel operatively connected with said storing device, and a conveyor member adapted for conveying along said conveyor channel bulk material arriving from said storing device into said conveyor channel. Systems of this kind are widely used in the plastics industry in conjunction with continuous and intermittent production processes in which bars, pipes, sheets, foils, plates and the like are produced by extrusion, calendering, rolling and/or coating, and/or formed parts are produced by injection molding. The feeding system or equipment may be used to supply production machines continuously or in batches with one or more plastic material components provided as granulates. Such feeding equipment or apparatus is frequently used to feed and mix two or more different granulates to a production machine or to a device located in front of such machine, for example to a device comprising stirring apparatus. In such a case the bulk material may be supplied in the form of granulated plastic material to which an additive also provided in the form of granulated material is then added. Such additive may be a dyestuff or another material adapted for influencing mechanical strength or other physical or chemical properties. Feeding and mixing equipment of this type may be used not only for processing plastics, but also for producing other types of goods such as fertilizers, plant protecting materials, other chemical and pharmaceutical substances and foods. The feeding method may be volumetric or gravimetric. If the feeding is volumetric, granulates supplied per unit of time are determined from volume output values of the conveyor members. If, on the other hand, the feeding is gravimetric, then the decreases in weight of the material disposed inside the storage devices are determined by weighing said storage devices containing the granulates, and perhaps by using feedback control for achieving predetermined values.

Attention is called here to the fact that the terms "at least one bulk material", "at least one storage device", etc., as used throughout the Specification and the Claims are intended to refer to one or more of the respective items. The term "each" as used, for example, in "each conveyor channel" is intended to be interpreted as addressing a "conveyor channel".

DESCRIPTION OF THE PRIOR ART

Known systems for feeding and mixing bulk materials comprise a storage device for each material to be fed, the outlet of the storage device being arranged to open into a conveying channel enclosing a feed screw or worm by means of which bulk material leaving the storage device outlet and entering the conveyor channel inlet is conveyed to the exit of the conveyor channel. The exits of all of the conveyor channels of the same system are arranged to open into a collector inlet, such as a collector hopper, of a processing machine, such as a plastic extruder.

During the operation of such a feeding system it is customary, particularly after changing the bulk materials to be fed and/or the quantity of bulk material to be supplied during controlled feeding per unit of time, to introduce —from time to time—samples of the processed bulk materials into special sample containers, to control for example whether the feeding operations are proceeding in the prescribed manner, and whether the supplied quantities of bulk material indeed correspond to the prescribed control values. The extraction of such samples from the known feeding systems requires on each such occasion the dismounting of at least one bulk-material-guide-element which during normal operation is mounted on the conveyor channel or on the collector inlet and replacing it by a chute built for the special purpose of such sample extraction. However, providing and storing such special chutes not only raises the cost of the feeding system but complicates its operation as well while raising its operational costs too. This is so—among other reasons—because during normal operation the chutes to be used for sample extraction must be stored in some place, they must be brought for sample extraction to their place of use and must be removed and stored again thereafter. In addition, with gravimetric feeding the replacement of guideways for the bulk material as provided during normal operation by the specially built chutes for sample extraction may cause disturbing changes in the tare weight. Thus, the required replacement of the afore-mentioned guideways used for normal operation by specially built chutes to be used for sample extraction involves significant drawbacks.

Each time the bulk material to be fed is changed and each time the material storage devices are cleaned these storage devices must be emptied. In the known feeding systems this is partially accomplished by driving the conveyor members at their largest possible rotational speed, until the associated storage device is empty. A drawback of this emptying method consists in its being comparatively time-consuming and in the fact that—in analogy to the case of sample extraction—at least one guideway provided during normal operation for the bulk material must be replaced by a chute specially built for the emptying process, to conduct the bulk material conveyed during the emptying process toward the exit, into a container different from the collector inlet or hopper of the extruder. It is also known in the art to empty a storage device by unmounting the conveyor channel from its storage device and to mount a specially built emptying chute directly to the outlet of the storage device. However, this variant, too, requires a specially built chute for the emptying process. Furthermore, while replacing the conveyor channel by an emptying chute some of the bulk material may escape from the storage device. Thus, the means provided for emptying the storage device as found in the feeding systems known in the art also have their various drawbacks. Also, the known feeding systems also often require elaborate and time-consuming measures to remove from or introduce into a conveyor channel a conveyor member consisting for example of a feed screw or worm. Cleaning the conveyor channel and its conveyor member, and the replacement of the latter, are thus made more difficult to carry out.

SUMMARY OF THE INVENTION

Hence from what has been explained heretofore it should be apparent that the art is still in need of a system for feeding at least one bulk material, a system not associated with the aforementioned drawbacks and limitations of the state-of-the-art proposals.

It is therefore a primary object of the present invention to provide a novel system for feeding at least one bulk material which is not associated with the drawbacks and limitations of the prior art as heretofore discussed and which effectively and reliably fulfills an existing need in the art.

Another and more specific object of the invention is to create a new and improved system for feeding at least one bulk material, the system to enable the simultaneous feeding and mixing of two or more granulates or bulk materials.

Yet a further object of the invention is to create a system for feeding at least one bulk material, the system to make it possible to extract samples of the bulk materials fed, simply and quickly.

A further object of the invention is to create a system for feeding at least one bulk material, the system to be manufacturable readily and economically.

The foregoing and other objects are attained in accordance with one aspect of the invention by providing a system for feeding at least one bulk material, the system comprising at least one device for storing the material, a conveyor channel operatively connected with said storing device and a conveyor member adapted for conveying along said conveyor channel bulk material arriving from said storage device into said conveyor channel, wherein for the or for each conveyor channel there is provided a chute adapted to be loosenably connected in at least two distinct positions with said conveyor channel, to lead bulk material from said conveyor channel in downward direction.

The invention offers the distinct advantages of enabling two or more granulates or bulk materials to be simultaneously fed and mixed, enabling the extraction of samples and the emptying of the storage devices to be carried out simply and quickly and the manufacture of the system to be made easily and economically.

BRIEF DESCRIPTION OF THE DRAWINGS

The subject matter of the invention will now be explained in more detail by making reference to the appended drawings illustrating several embodiments of the system of the invention. They show:

FIG. 1 a perspective view of a system for feeding and mixing bulk materials or granulates, FIG. 2 a schematic perspective view of the bottom part of an individual material storage device, together with the associated conveyor channel and chute, in which view the two channels are shown broken off and a cover plate of the bottom part of the material storage device as well as the hook-in members of the chute have been omitted, FIG. 3 a side view of a conveyor channel, FIG. 4 a section through a conveyor channel along the line 4—4 of FIG. 3, FIG. 5 a longitudinal section through a chute, FIG. 6 a section through the chute of FIG. 5 along the line 6—6, FIG. 7 a longitudinal section through segments of a conveyor channel and of a chute suspended in its working position on the conveyor channel, FIG. 8 a longitudinal section through the locking member displaceably guided in the conveyor channel, at a scale larger than that of FIGS. 3 and 4, FIG. 9 a section through the locking member, FIG. 10 a top view of a support located at the upper end of a conveyor channel for holding a conveyor member, in which view the cover hood covering the support is omitted and rolling circles drawn in dash-dotted lines are shown to represent the gears provided on the side of the support facing the observer, FIG. 11 a conveyor member shown in part in axial section and in part in front view, and a bearing device for supporting the conveyor member, FIG. 12 a schematic view of a material storage device and its associated conveyor channel, the chute being shown in its working position, FIG. 13 a view similar to FIG. 12 in which, however, the chute is shown in its sample extracting position and FIG. 14 a view similar to FIG. 12 in which, however, the chute is shown in its emptying position.

DETAILED DESCRIPTION OF THE PREFERRED EMBODIMENTS

Figure 1:
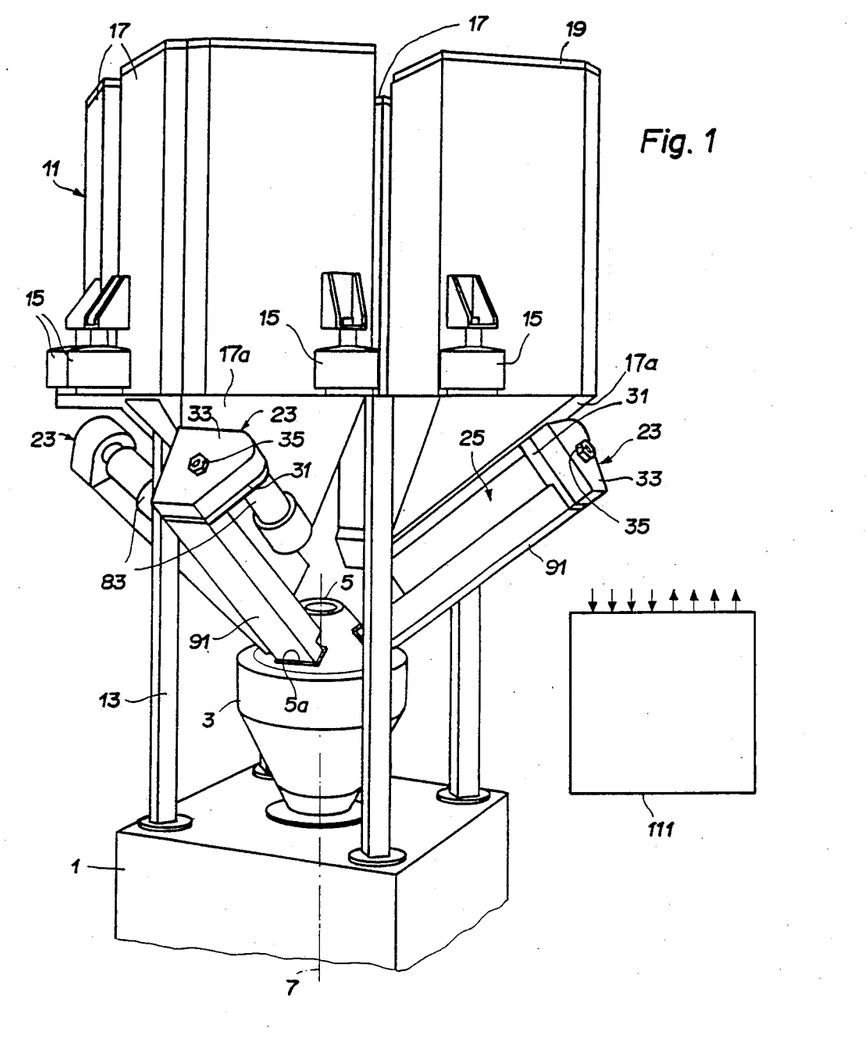

FIG. 1 shows a machine 1 for processing a bulk material mixture operatively connected with a system 11 for feeding the bulk material mixture to the machine 1. The machine 1 is typically, but not necessarily, an extruder adapted for the continuous extrusion of plastic parts. The machine 1 comprises a funnel shaped material collector inlet 3, typically a hopper covered by an upwardly narrowing cover part 5 provided with four inlet orifices 5a distributed around a vertical axis 7. The multiple feeding system 11 possesses a frame 13 comprising for example columns distributed around the axis 7 and rigidly connected to the frame of the machine 1. The feeding system 11 comprises at least two, for example four, preferably identical material storage devices 17, each being connected with the frame 13 by way of at least one, for example three, load-measuring transducers 15. The storage devices are distributed, looking from above, around a common central region of the system 11 containing the collector inlet 3 and its axis 7. Each storage device 17 comprises a prismatic upper part closed on top by a removable cover 19 and downwardly narrowing lower or bottom part provided with a plane wall member 17a slanted or tilted toward the axis 7. This wall member 17a displays in its lower region an opening visible in FIG. 2 and constituting an outlet orifice 21. At least one of the other wall members at the bottom part of each storage device 17 is provided with a loosenably mounted closing plate not shown in FIG. 2, but adapted to close off or open the above-mentioned opening or orifice 21 for example of triangular shape.

Figure 10:
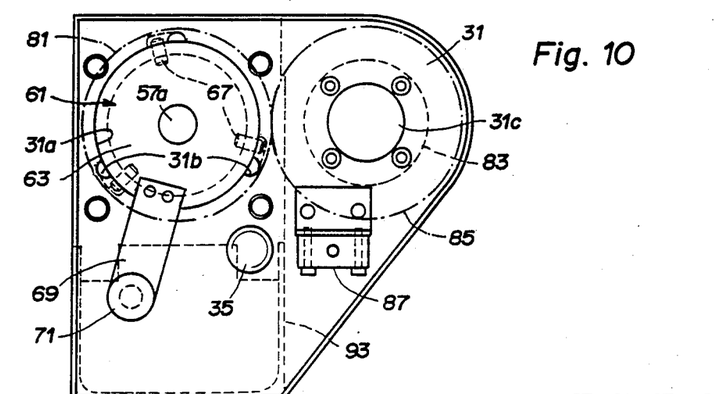

The wall member 17a of each material storage device 17 has mounted thereon a discharge device designated as a whole by the reference numeral 23. The discharge device 23 comprises a conveyor channel 25 tilted in its longitudinal and conveying direction like the wall part 17a, the tilt angle measured with respect to a horizontal plane lying between 30° and 60°, for example between 35° and 45°. The conveyor channel 25 drawn separately in horizontal position in FIGS. 3 and 4 comprises an elongated housing 27 consisting of an one-piece plastic body and having at its lower end an end plate 29 and at its upper end a plate-shaped support 31 loosenably connected thereto by means of threaded bolts, the support 31 being arranged to protrude at places beyond the housing 27. As shown in FIG. 10 the support 31 possesses a throughgoing stepped hole 31a, three locking recesses 31b equally distributed around the hole 31a and a further hole 31c located—in a projection parallel to the longitudinal direction—adjacent to the housing 27. The support 31 carries additional components, described below in more detail, and is covered on top and on the outside by means of the hood 33 shown in FIGS.

Figures 2, 4, 7:
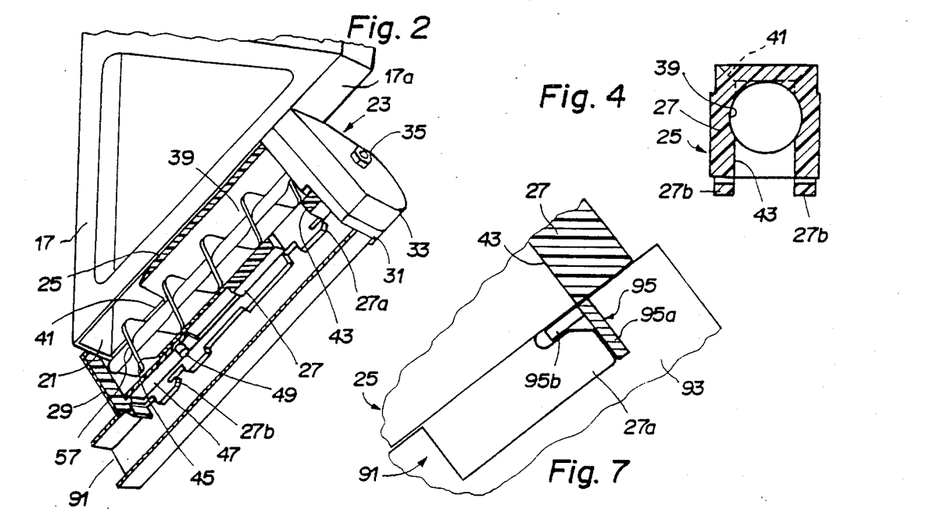
Figure 3:
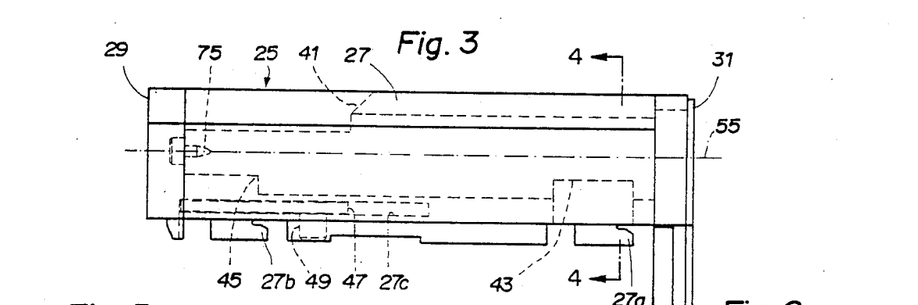

1 and 2 but omitted in FIGS. 3 and 10. The hood 33 is loosenably fastened by fastening means 35 comprising for example a threaded bolt and a nut, the bolt being anchored in the support 31 and arranged to penetrate through a bore of the hood 33. The housing 27 possesses in cross-section a generally square perimeter and bounds a passage 39 for the bulk material or granulate to be conveyed. In the central part of the conveyor channel 25 the passage 39 is in cross-section circular and closed, and has a straight, tilted longitudinal central axis 55. The tilted cover plate that constitutes in cross-section the upper boundary of the housing 27 comprises in the lower end section of the conveyor channel an opening or recess which overlaps the outlet orifice 21 at least in part. This opening or recess opens into the passage 39 and constitutes the entrance 41 of the conveyor channel 25. The tilted bottom wall of the housing comprises in the end section of the upper conveyor channel an opening leading from the passage 39 downward and serving as a first, upper exit 43 of the conveyor channel. This first, upper exit 43 is located along the axis 55 at a distance from the entrance 41 and is disposed at a higher location on the axis 55 than the entrance 41. Also, the entire boundary of the exit 43 is located above the boundary of the entrance 41. The bottom wall of the housing 27 comprises at its lower end as well as below the entrance 41 an opening constituting a second, lower exit 45 or, more accurately, a recess cut into the wall starting at the lower bottom wall end. Thus, the second, lower exit 45 extends as far as the deepest location of the inside space of the conveyor channel 25. The bottom wall of the housing 27 furthermore comprises at its two longitudinal edges ribs running along these edges. Each of these ribs is subdivided by means of slots into several sections, the uppermost and the lowermost of which run generally parallel to the longitudinal direction of the conveyor channel 25 and thus have slots cut-in starting from above and constituting hook-shaped suspension members 27a and 27b, respectively.

Figure 8:
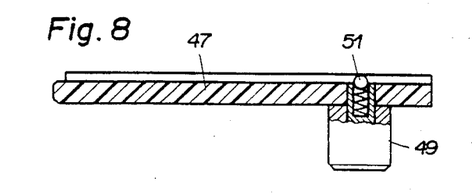
Figure 9:
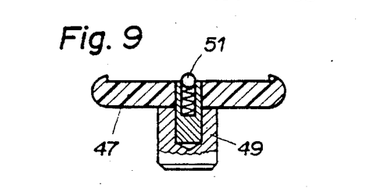

The bottom wall of the housing 27 is furthermore provided with a guideway 27c located in a region containing the lower exit 45, a locking member 47 drawn separately in the FIGS. 8 and 9 being displaceably guided in this guideway 27c in longitudinal direction of the conveyor channel, said locking member 47 being effective to close off the lower exit 45 in its closing position, and to open it in its opening position. The locking member 47 comprises on its slanted underside a stud protruding downward and arranged to serve as servicing and locking member 49. At the same time a partially hollow threaded bolt provided for clamping the servicing and locking member 49 in position, serves for movably holding a spring-loaded detent member 51. The detent member 51 consists of a spherical ball and constitutes together with two detent recesses of the housing 27 detent means, whereby the detent member 51 snaps into the detent recesses in the locked and unlocked positions, respectively, of the locking member 43.

Figure 11:
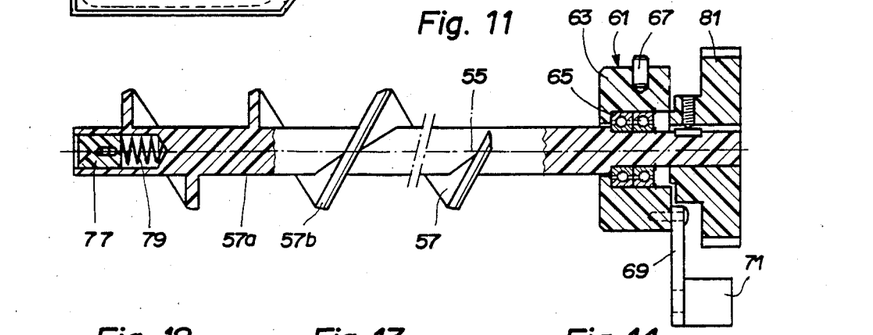

Each discharge device 23 has an associated conveyor member 57 shown in FIGS. 2 and 11 and supported rotatably around the axis 55 of its passage 39. The conveyor member 57, specifically a feed-screw or worm, comprises a shaft 57a and at least one helical member 57b made of plastic of one piece with the shaft 57a and having the configuration of a single-threaded screw. At one side of its helical member 57b, the conveyor member 57 is supported inside a bearing device 61, radially and axially. The bearing device comprises a ring-shaped bearing housing 63 made of plastic material and at least one bearing 65, or for example two such bearings, provided with rolling members, such as bearing balls. The outer diameter of the bearing housing 63 is dimensioned to removably fit, i.e. with small radial play, into the further section of the stepped hole 31a located on the outer side of the support 31. The bearing housing 63 comprises three radial blind holes distributed around its periphery and having studs protruding from the bearing housing and serving as locking members 67 fixedly anchored therein. Also fixedly mounted on the bearing housing 63 is the pivot arm 69 provided with a handle 71 and adapted for manually pivoting the bearing housing 63. If the bearing housing 63 is in its pivoted position shown in FIG. 10, then the locking members 67 are in engagement with the locking recesses 31b and are effective to secure the bearing housing 63 against displacements directed away from the housing 27. If, on the other hand, in the view shown in FIG. 10 the bearing housing 63 is pivoted by means of the pivot arm 69 slightly clockwise, then the bearing device 61 together with the conveyor member it supports may be pulled out of the conveyor channel obliquely and upward. The locking members 67 together with the locking recesses 31b thus constitute a bayonet lock type fastening means for loosenably fastening the bearing device 61 on the support 31 of the conveyor channel 25. In operation the conveyor member 57 is rotated counterclockwise—in the view shown in FIG. 10—in a way to make the conveyor member attempt to rotate the bearing housing 63 into the pivoted position in which the bearing housing 63 is interlocked with the support 31 by means of the locking members 67. The end plate 29 also comprises a point support device 75 mounted thereto, which engages a conical recess of a bearing member 77 held axially displaceably inside a blind hole of the shaft 57a at the side of the helical member 57b facing away from the bearing device and is pressed against the point support device 75 by means of a spring 79. The end of the conveyor member shaft 57a that protrudes beyond the support 31 and the bearing device 61 has a gear 81 disposed thereon as indicated in FIG. 10 by dash-dotted lines and shown in FIG. 11 in section. Adjacent to the housing 27 the support 31 has mounted thereto a drive device including an electric motor and a transmission, the motor being a direct current motor with electrically variable rotational speed. This transmission comprises a shaft passing through the hole 31c of the support 31 and arranged to carry a gear 85 mating with the gear 81 and indicated in FIG. 10 by dash-dotted lines. The gear 85 is so dimensioned, that it will not prevent the bearing device 61 and the conveyor member 57 to be removed from the conveyor channel or to be introduced thereinto. The support 31 also has a limit switch 87 mounted on it. The cover hood 33 covers the pivot arm 69, the gears 81, 85 and the limit switch 87 against the surroundings and is able to secure the pivot arm 69 against being unlocked from the bearing device 61. The limit switch 87 is positioned to interrupt the current supply to the motor of the drive device 83 if the cover hood 33 is unmounted.

Figure 5:
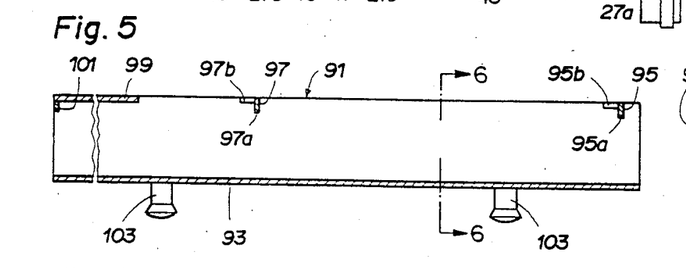
Figure 6:
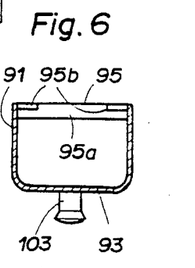

Each of the discharge devices 23 associated with one of the four storage devices 17 also comprises a chute 91. In FIG. 1 the chute associated with the second storage device, counting from the right, is omitted. One of the chutes 91 is separately shown in FIGS. 5 and 6 in its unmounted state and comprises as its main component a channel 93 U-shaped in cross-section. This channel 93 is open at both ends, or more accurately, is bounded by narrow marginal surfaces defining at each of the two channel ends a plane forming an angle with the longitudinal direction of the channel, namely a right angle. Between the two longitudinal edges of the channel 93 are fixedly mounted two bars 95 and 97, one being located near the channel end at the right of FIG. 5, and the other in the central region of the channel, the two bars being adapted to serve as hook-in members 95 and 97, respectively. Each hook-in member 95, 97 consists of a piece of an angular profile comprising the legs 95a and 97a, respectively, disposed between and perpendicular to the longitudinal margins of the channel 93. The other leg of each of the hook-in members 95, 97, which protrudes away from the respective legs 95a, 97a, and extends parallel to the longitudinal direction of the channel 93, has its central region cut out, leaving at each of its ends only two tongue-shaped pieces 95b and 97b, respectively, lying in a plane parallel to the longitudinal direction of the chute. These pieces form, together with their respective adjacent legs 95a or 97a, a sort of a hook. The left end section of the channel 93 is covered by a cover plate 99 visible in FIG. 5. At this left channel end there is also provided a hook-in member 101 comprising a bar extending perpendicular to and connecting the two side walls of the channel. This hook-in member consists of a flat or angular profile running perpendicular to the longitudinal direction of the chute and protruding away from the cover plate 99 and toward the bottom of the channel 93. The cover plate 99 together with the hook-in member 101 touching its lower side, at least approximately, constitutes a type of an angular hook. Attention is called to the fact, that in FIG. 2 the hook-in members 95, 97, 101 have been omitted for the sake of clarity. Two stud-shaped handles 103 are fixedly mounted on the bottom wall of the channel 93.

The suspension members 27a, 27b of the conveyor channel 25 together with the hook-in members 95, 97, 101 constitute suspension means enabling the chute 91 to be loosenably connected with the conveyor channel 25 by suspending the chute 91 in various positions, as desired. In FIGS. 1, 2, 7 and 12 the chute 91 is shown in its working position. In this position the chute 91 extends parallel to the conveyor channel 25 in longitudinal direction thereof, while its channel 93 abuts, with its longitudinal margins located in cross-section on top, against the bottom wall of the housing 27 constituting in cross-section the lower boundary of the conveyor channel 25. The chute 91 is mounted into its working position by hooking its hook-in members 95 and 97 into the respective suspension members 27a, 27b of the conveyor channel. Each of the two pieces 95b of the hook-in member 95 will then engage—as shown for one of them in FIG. 7 obliquely and from above, the slots of one of the hook-like suspension members 27a, and comes to rest against the lower of the two bounding surfaces of the slot extending parallel to the longitudinal direction of the channel. Furthermore, the leg 95a rests against a surface of the two suspension beams 27a, the surfaces extending at right angles to the longitudinal direction of the channel. In analogous manner the hook-in member 97 is hooked into the two suspension members 27b. The chute 91 may be fixedly mounted on the conveyor channel into its working position by merely lifting the chute to the conveyor channel 25 and then displacing it obliquely downward, to position its hook-in members 95, 97 in the position described. The chute will then be held fixed in its working position by the force of gravity, without any other fastening means needing to be provided for the purpose. To unmount the chute from its working position on the conveyor channel only requires unhooking again its hook-in members 95, 97 from the suspension members 27a and 27b, by displacing the chute along the conveyor channel obliquely and upwardly. The support 31 is built to enable the end of the channel 93 disposed in the working position on top, to embrace a shoulder of the support 31 which closes off said end of the channel 93. As a result, the respective chute 91 together with the channel 93 embracing said shoulder may be displaced by the distance required by the processes of hooking-in and hooking-out. The end section of the channel 93 disposed in the working position of each chute on the bottom, and protruding obliquely downward beyond the conveyor channel 25 is covered on its upper side by the cover plate 99. The lower end of each chute 91 in working position is arranged to open into the inside of the collector inlet 3 by way of the inlet orifice 5a provided in the cover member 5 of the collector inlet or hopper 3.

Figures 12, 13, 14:
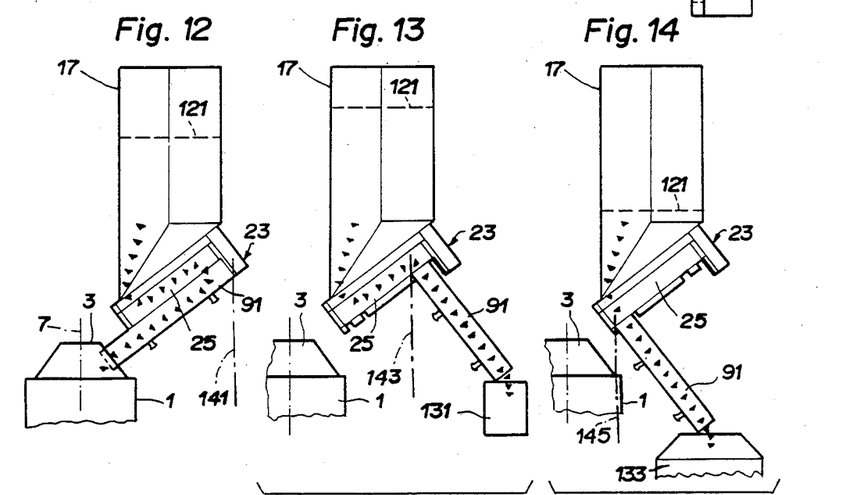

Each of the four chutes 91 may be fixedly mounted on the conveyor channel 25 in its sampling position shown in FIG. 13 rather than its working position. For this purpose the chute 91 is hooked into the suspension members 27a at the upper end of the conveyor channel 25 by way of its hook-in member 101, in a way to have the cover plate 99 rest on said suspension members 27a in the manner the leg 95a does in FIG. 7. The end of the chute 91 disposed in the working position of said chute 91 on the bottom, is disposed in its sampling position at the upper end of the conveyor channel 25. In its sampling position the chute rests with the margins provided at the respective end of the channel 93 and with the cover plate 99 on the bottom wall of the housing 27 of the conveyor channel 25, while at the same time the channel 93 encloses the first, upper conveyor channel exit 43, at least at the lower boundary and at the two lateral boundaries thereof. In the sampling position the chute protrudes downwardly and tilted away with respect to the conveyor channel while forming with the longitudinal direction of the conveyor channel an angle corresponding specifically to the angle formed between the longitudinal direction of the channel 93 and the plane defined by the margins of the channel 93 provided at the respective channel end, namely a right angle. The bottom wall of the channel 93 will then be disposed in cross-section on the longitudinal side of said bottom wall lying deepest. The chutes own weight and the weight of the bulk material sliding through the chute during sampling produce a rotational moment with respect to the support defined by the suspension members 27a and the hook-in member 101, this rotational moment acting with an effort to impart the chute shown in FIG. 3 a clockwise rotation. This rotational moment is thus effective to press the region of the channel margin provided at the respective end of the channel 93 and located below the hook-in member 101, against the conveyor channel, and thus to hold the chute in the described position.

Furthermore, each chute 91 can be loosenably mounted on the conveyor channel 25 in its emptying position shown in FIG. 14. In this case the hook-in member 101 is hooked into the two lower suspension members 27b. The chute end disposed in FIG. 13 at the upper end of the conveyor channel is now disposed at the lower end of the conveyor channel. Aside from these differences, the chute 91 is held in its emptying position on the conveyor channel 25 in a manner similar to the manner it is held in the sampling position.

Each load-measuring transducer 15 comprises means, in particular vibrating strings and electronic components adapted to generate an electrical signal designed to represent a measure for the load or force exerted on the transducer 15 by the respective storage device 17. The feeding system 11 furthermore comprises an electronic control device 111 with or without feedback and schematically shown in FIG. 1 as a rectangular box, and connected by means of electrical cables, indicated by arrows, with the load-measuring transducers 15 and the motors of the drive devices 83. The control device 111 comprises electronic circuit means provided for determining from the electrical signals supplied by the load-measuring transducers the weights of the storage devices 17 including their associated discharge devices 23, as well as the weights of the bulk material contained in the storage devices and the discharge devices and, based on the decreases in these weights during operation, to regulate—by controlling the rotational speeds of the conveying members 57—the quantities of bulk material conveyed by these conveying members 57 per unit of time, to keep these quantities within allowable ranges and preferably to have them assume accurate predetermined values. The device 111 furthermore comprises input and/or adjusting members provided for entering and/or adjusting the desired values and allowable limits in digital or analog form and to change them, if required, as a function of time in accordance with a program.

During normal operation of the feeding system 11 all of the chutes 91 associated with the used storage devices 17 are fixedly mounted in their working positions. The bulk material or granulate provided inside each storage device 17 and designated in FIG. 12 by the reference numeral 121 first slides or falls through the outlet 21 of the storage device and the entrance 41 of the conveyor channel 25 into the passage 39 of the latter, then it is conveyed upward to the upper exit 43 by means of the conveyor member 57 disposed in the passage 39, it arrives through this passage 39 into the chute 91 and finally slides along the chute 91 to the collector inlet 3. The displacement of the bulk material is indicated in FIG. 12, as well as in FIGS. 13 and 14, by means of arrows. The sliding direction of the bulk material in the chute 91 is anti-parallel, i.e. parallel but in opposite direction, relative to the conveying direction of the bulk material inside the conveying channel 25. The bulk materials originating from the various storage devices and conveyed by the conveying members are made to arrive together into the collector inlet 3 and are mutually intermixed.

If a sample of the bulk material is to be extracted from a storage device 17, the chute 91 associated with the respective storage device is unhooked and rehooked again in its sampling position shown in FIG. 13. During this unhooking and rehooking process the drive device 83 is switched off. During the sampling process the bulk material 121 is conveyed by the conveyor member to the upper exit 43 of the conveyor channel and is enabled to slide through the chute into a container 131 provided for receiving the extracted sample. This container 131 is disposed in a region of space removed from the machine 1 as well as from the collector inlet 3.

If one of the storage devices 17 is to be emptied, the associated chute 91 shown in FIG. 14 is suspended into its emptying position at the lower end of the conveyor channel. Then the locking member 47 is manually displaced into its releasing position, in which it opens the lower exit 45 of the conveying channel 25. The bulk material will then again arrive from the inside of the storage space 17 through the outlet space 21 thereof and the entrance 41 of the conveyor channel 25 into the first segment, i.e. the lowest segment of the passage 39. There, the bulk material will slide and/or fall under the action of the force of gravity through the regions of the lowest passage section left free by the conveyor member, to the exit 45. The dimensions as well as the disposition of the entrance 41, the lower exit 45 and the conveyor member 57 are coordinated with each other so, that in each possible rotational position of the conveyor member bulk material can move from the entrance 41 to the exit 45 on both longitudinal sides of the conveyor member shaft 57a. From the exit 45 the bulk material will get into the chute 91 and will finally slide through the chute 91 into a container 133 provided for receiving the bulk material and located in a region of space removed from the machine 1 and also from the collector inlet 3 thereof as looked at in a top view. As soon as the emptying has been accomplished, the lower conveyor channel exit 45 can be closed-off again by displacing the locking member 47. The servicing and securing member 49 serving during displacement as handle arranged to make it protrude in the unlocking position of the locking member into that region of space in which the hook-in member 97 is located in the working position. The servicing and securing member 49 is thus effective to secure the feeding system in the open state of the lower exit 45 against the chute becoming hooked-in in the working position. In addition, the locking member 47 may be provided and/or connected with means adapted to prevent in its unlocking position—in cooperation with the limit switch 87 or with an additional limit switch—the motor of the drive device 83 from being switched on, to thus prevent any accidents from occurring.

As explained above, the bulk material getting during normal operation and during sampling from the four storage devices 17 into the respective conveyor channel 25 is conveyed along each said channel upwardly to the upper exit 43, along a direction tilted away from the axis 7 located, when looked from above, in the central region between the four storage devices. In the working position the chutes are tilted downward and toward the axis 7 and toward the aforementioned central region, whereas in the sampling position and in the emptying position the chutes are tilted at a right angle to the respective conveying channel, downward and away from the axis 7 and from said central region, toward a region of space in which room is provided for the container 131 or 133, respectively, destined for receiving the bulk material issuing during sampling or emptying the storage devices. In FIGS. 12 to 14 are shown the vertical planes 141, 143, 145, respectively, each plane extending through the respective upper end of the bottom wall of the channel of the chute 91. The three vertical planes 141, 143, 145 are mutually parallel to each other as well as perpendicular to the planes of the FIGS. 12 to 14 and thus equally perpendicular to vertical planes defined by the longitudinal directions of the conveyor channel 25 and the chute 91 shown in these figures. This chute is thus tilted—from the top toward the bottom—in the working position toward the left side of the vertical plane 141, and in the sampling position and the emptying position toward the right side of the vertical planes 143 and 145, respectively. Each of the other chutes of the feeding system is analogously tilted in the working position toward one side and in the sampling position and the emptying position toward the other side of mutually parallel vertical planes. As also explained above, one and the same chute 91 may be fixedly and loosenably mounted to the conveyor channel 25 of the respective discharge device 23 in one of three positions, as desired. Thus, the positions of the chutes 91 may be changed by only unhooking and rehooking them, operations which may be accomplished simply and fast.

If a conveyor channel and its associated conveyor member is to be cleaned and/or a conveyor member is to be replaced, for example for changing the bulk material to be conveyed, disassembling the conveyor member only requires the respective cover hood 33 to be removed and the pivot arm 69 to be pivoted. Then the conveyor member may be removed from the conveyor channel obliquely and upwardly and away from the axis 7, while at the same time the bearing device 61 will become separated from the support 31 and the gears 81, 85 will get disengaged from each other. The conveyor member, or a different conveyor member, may then be introduced into the conveyor channel, with the result that the bearing device 61 will become again inserted into the stepped hole 31a of the support and the conveyor member again brought—by means of the aforementioned gears 81, 85—into operative rotational connection with the drive device 83. The two gears 81, 85 thus serve during the assembly and disassembly of a conveyor member to a certain extent as coupling devices between the conveyor member and the motor. As soon as the bearing device 61 is again fitted inside the hole 31a of the support 31, it will become interlocked with the support 31 by pivoting the pivot arm 69 together with the bearing housing 63. Then, evidently, the cover hood will have to be remounted. Thus, the disassembly and assembly of a conveyor member may also be accomplished quickly and simply. The pivot arm is mounted for example to prevent the cover hood 33 from being mounted while the pivot arm is in its unlocked position, in which the locking members 67 can be removed from the locking recesses 31b. As already mentioned, when the cover hood 33 is removed, the limit switch 87 is effective to interrupt the supply of current to the motor of the drive device 83 and to prevent the motor from operating as long as the cover hood 33 is removed.

The feeding system and its operation may be varied in many ways. For example, rather than having a frame connected to the frame of the machine 1, for example an extruder, the feeding system could be provided with a frame independent of the machine, i.e. a frame mounted separately on the floor. Furthermore, rather than opening into the inlet of a machine for processing a bulk material mixture, the chutes may be arranged to open into the inlet of a mixing and collecting container. Furthermore, a feeding system comprising four storage devices, each with its associated discharge device, may evidently be used at times for feeding only two or three kinds of bulk materials or granulates. Also, the number of storage devices and discharge devices provided may be as low as two or three, or it may be more then four. Alternately, the feeding system may comprise one single storage device equipped with one single associated discharge device of the described type.

The suspension means for loosenably mount a chute in various positions may be similarly modified in various ways. Of the hook-in members 95, 97, 101 extending over the entire width of the chute, it would be possible to omit the central pieces disposed in their mounted state between the suspension beams, with the result that three separate hook-in members would then be provided on each longitudinal side of the chute. Furthermore, in addition to the hook-in members there could be provided loosenable securing and/or fastening devices built in the manner of snap closures destined for securing and fastening the chutes.

The channel 93 of the chute 91 could be bounded —at least at the end which in the working position is disposed on the bottom and in the sampling position and the emptying position on top—by margins defining a plane extending not exactly but only approximately at a right angle to the longitudinal direction of the channel, and could form with said longitudinal direction an angle between 70° and 110° for example. The chute could then be disposed in its working position parallel to the conveyor channel, as in the embodiment shown in FIGS. 1 to 14, but form with the conveyor channel an angle in the range of 70° to 110° in the sampling and the emptying positions.

Rather than providing a feed-screw, each conveyor member could be provided with a hollow helical coil spring-loaded in axial direction and enclosing an open hollow space or—with only small play—a fixed mandrel or else a mandrel rotating during operation together with the helical coil. Furthermore, for every conveyor channel there could be provided two conveyor members adapted to be rotated around axes extending adjacent and parallel to each other and comprising feed-screws and/or helical coils in engagement with each other.

While there are shown and described present preferred embodiments of the invention, it is to be distinctly understood, that the invention is not limited thereto but may be otherwise variously embodied and practiced within the scope of the appended claims.

What is claimed is:

1. System for feeding at least one bulk material, the system comprising at least one storage device for storing bulk material, wherein a conveyor channel, a conveyor member and a chute each are provided for and associated with each said storage device, said conveyor channel is disposed below and is connected with an associated storage device and is provided with an entrance communicating with the inner space of said associated storage device and an exit, said conveyor channel is disposed sloping upward from said entrance to said exit, said conveyor member is mounted in said conveyor channel and adapted to convey along said conveyor channel bulk material entering said conveyor channel from said associated storage device, each said chute is adapted to be removably connected in at least two distinct positions with an associated said conveyor channel to carry bulk material coming therefrom in a downward direction, each chute extending, in a first of said distinct positions along a bottom boundary of said associated conveyor channel and having said exit open into the respective chute, so that any bulk material arriving from said exit into said chute slides through said chute downward in a direction parallel but opposite to the direction along which the bulk material is conveyed inside said associated conveyor channel from the entrance thereof to said exit, said chute being arranged to form an angle with said associated conveyor channel in at least one further of said at least two distinct positions.

2. System as claimed in claim 1, wherein each said associated conveyor channel and chute is provided with suspension means which enable each said chute to be removably suspended on said associated conveyor channel in said distinct positions, the suspension means being adapted to allow connecting and disconnecting said chute by hooking or unhooking respectively.

3. System as claimed in claim 2, wherein the suspension means are adapted to enable said chute suspended on the associated conveyor channel to be unhooked from the latter by displacing the chute in upward direction along the conveyor channel.

4. System as claimed in claim 2, wherein said suspension means comprises suspension members fastened to each said conveyor channel and spaced along the latter and hook-in members fastened to each said chute and spaced along same wherein said chute in its first position disposed parallel to said associated conveyor channel is suspended by suspension members and hook-in members on said conveyor channel at locations disposed longitudinally at a distance from each other.

5. System as claimed in claim 4, wherein each said chute comprises in cross-section a U-shaped channel substantially open on its upper, longitudinal side, at least in a portion disposed adjacent to said associated conveyor channel when connected in said first distinct position.

6. System as claimed in claim 1, comprising at least two storage devices, each having a conveyor channel connected thereof, wherein the conveyor channels diverge upwardly away from each other, and wherein in their first distinct position said chutes converge downwardly toward each other.

7. System as claimed in claim 6, wherein in their first distinct position said chutes converge downwardly toward a common region located, in top view, centrally with respect to the various storage devices.

8. System as claimed in claim 1, wherein each storage device tapers in downward direction, at least in its lower region, and is provided in this region with a sloping wall part, and a said conveyor channel is fixedly mounted to the underside of said sloping wall part of its associated storage device and extends parallel to same.

9. System as claimed in claim 1, wherein the exit of each said conveyor channel opens in a location disposed in cross-section section on the upper side of said chute when said chute is connected in said first distinct position.

10. System as claimed in claim 9, wherein the chutes diverge downwardly in their at least one further of said at least two distinct positions.

11. System as claimed in claim 1, wherein each chute is straight and of rigid shape along its entire length.

12. System as claimed in claim 1, wherein the longitudinal direction of each said chute, in said first and said at least one further distinct position, is arranged to slope from the top toward the bottom on sides facing away from each other of parallel vertical planes extending through an upper end of said chute, said vertical planes extending at a right angle to a vertical plane passing through and parallel to the longitudinal centerline of said chute and its said associated conveyor channel.

13. System as claimed in claim 1, wherein in one of said at least one further positions, said chute rests with an open end on its associated conveyor channel in a way to have said exit of said conveyor channel disposed at an upper end section made to open into said chute.

14. System as claimed in claim 13, wherein said angle formed by said chute in its said at least one further position with said associated conveyor channel is at least approximately a right angle.

15. System as claimed in claim 1, wherein each said conveyor member comprises a helical member which encloses an axis extending along the longitudinal direction of said associated conveyor channel and is supported above the upper end of said helical member in a bearing device held removably fixed in a support disposed at the upper end of said conveyor channel in a way to make said bearing device together with said conveyor member supported by same removable from same conveyor channel and said support by upwardly pulling the conveyor member from said conveyor channel, said bearing device being provided with at least one locking member pivotable around said axis and adapted to lock said bearing device in relation to said support in one pivot position and to secure it against axial displacements and to enable the removal of said bearing device from said support in a second pivot position.

16. System as claimed in claim 15, wherein each said conveyor member is adapted to be driven by a drive device comprising an electrical motor and a first gear mounted on said conveyor member, said first gear being connected for rotation with said electrical motor by way of a mating gear while said bearing device is fixedly mounted on said support, said first gear being disengaged from said mating gear by pulling said conveyor member out of said conveyor channel.

17. System as claimed in claim 1, wherein each said conveyor member comprises a helical member enclosing an axis extending along the longitudinal direction of said associated conveyor channel, said system further comprising a drive device comprising an electrical motor for each said conveyor member, said drive device adapted to rotate said conveyor member, at least one load-measuring transducer provided for each said storage device, and a control device, said control device electrically connected with said electrical motor as well as with each said load-measuring transducer to control the rate of bulk material conveyed by each said conveyor member.

18. System for feeding at least one bulk material, the system comprising storage devices for storing bulk material, wherein a conveyor channel, a conveyor member and a chute each are provided for and associated with each said storage device, wherein each conveyor channel is disposed below and is connected with said associated storage device and is provided with an entrance communicating with the inner space of said associated storage device and an exit, said conveyor channel is disposed sloping upward from said entrance to said exit, wherein, furthermore, a said conveyor member is mounted in each said conveyor member channel and is adapted to convey along said conveyor channel bulk material entering said conveyor channel from said associated storage device, each said chute is adapted to be removably connected in at least two distinct positions with an associated said conveyor channel and to carry bulk material coming therefrom in a downward direction, each chute extending in a first of at least two distinct positions along a bottom boundary of said associated conveyor channel, said exit opening from said conveyor channel into the associated said chute so that any bulk material arriving from said exit into said chute is enabled to slide through said chute downward in a direction parallel but opposite to the direction along which the bulk material is conveyed inside said conveyor channel from the entrance thereof to its exit and wherein each said conveyor channel is arranged to diverge in upward direction and said chutes are arranged to converge in their first position in a downward direction, each said chute further being arranged to form an angle with said associated conveyor channel in at least one further of said at least two distinct positions.

19. System as claimed in claim 18, wherein each said conveyor channel is provided with suspension members and each said chute is provided with hook-in members to enable said chute to be removably suspended in said at least two distinct positions, wherein said suspension members and said hook-in members are adapted to enable each chute suspended on said associated conveyor channel to be unhooked therefrom by displacing said chute in an upward direction in relation to the slope of said associated conveyor channel.

20. System for feeding at least one bulk material, the system comprising at least one storage device for storing bulk material, wherein a conveyor channel, a conveyor member and a chute each are provided for and associated with each said storage device, wherein said conveyor channel operatively connected with said associated storage device is arranged to slope upwardly, a lower end section of said conveyor channel having an entrance communicating with an inner space of said associated storage device, a first exit at an upper end section of said conveyor channel and a second exit at a lower end section below said entrance, said second exit being adapted to be closed off by means of a displaceable locking member, a said conveyor member mounted in each said conveyor channel is adapted to convey bulk material from said entrance to said first exit and to enable, in all of its possible positions, bulk material to move under the action of the force of gravity, from the said entrance to and through said second exit when said second entrance is open, each said chute is adapted to be removably connected to an associated said conveyor channel in one of at least two distinct positions, in a first position said chute extends along a bottom boundary of said conveyor channel, in said first position of said chute said first exit open into said chute in a location disposed in cross-section on the upper side of said chute so that any bulk material arriving from said first exit into said chute is enabled to slide through said chute downwardly, in a direction parallel to but opposite from the conveying direction along which the bulk material is conveyable inside said conveyor channel from said entrance thereof to its first exit, and wherein in a further position of said at least two distinct positions in which each chute can be connected with said associated conveyor channel, said chute forms an angle with said conveyor channel and rests with an open end on said conveyor channel at said second exit of said channel in a way to have second exit open into said chute.

21. System as claimed in claim 20, wherein in the position of the chute in which its open end rests on said conveyor channel at the second exit, said chute forms with said conveyor channel at least approximately a right angle.

22. System as claimed in claim 20, wherein said locking member is manually displaceable along said conveyor channel.

23. System as claimed in claim 20, wherein detent means are provided and adapted to loosenably lock the locking member in either of two positions, to make it close or open the second exit.

24. System as claimed in claim 23, wherein in its position in which it opens said second exit, said locking member is also effective to prevent the chute from being fixedly mountable into said first position which runs parallel to the conveyor channel.

* * * * *